O. A. SMITH.
MULTIPLE SPINDLE LATHE.
APPLICATION FILED NOV. 24, 1917.
1,318,116.
Patented Oct. 7, 1919.
5 SHEETS—SHEET 1.
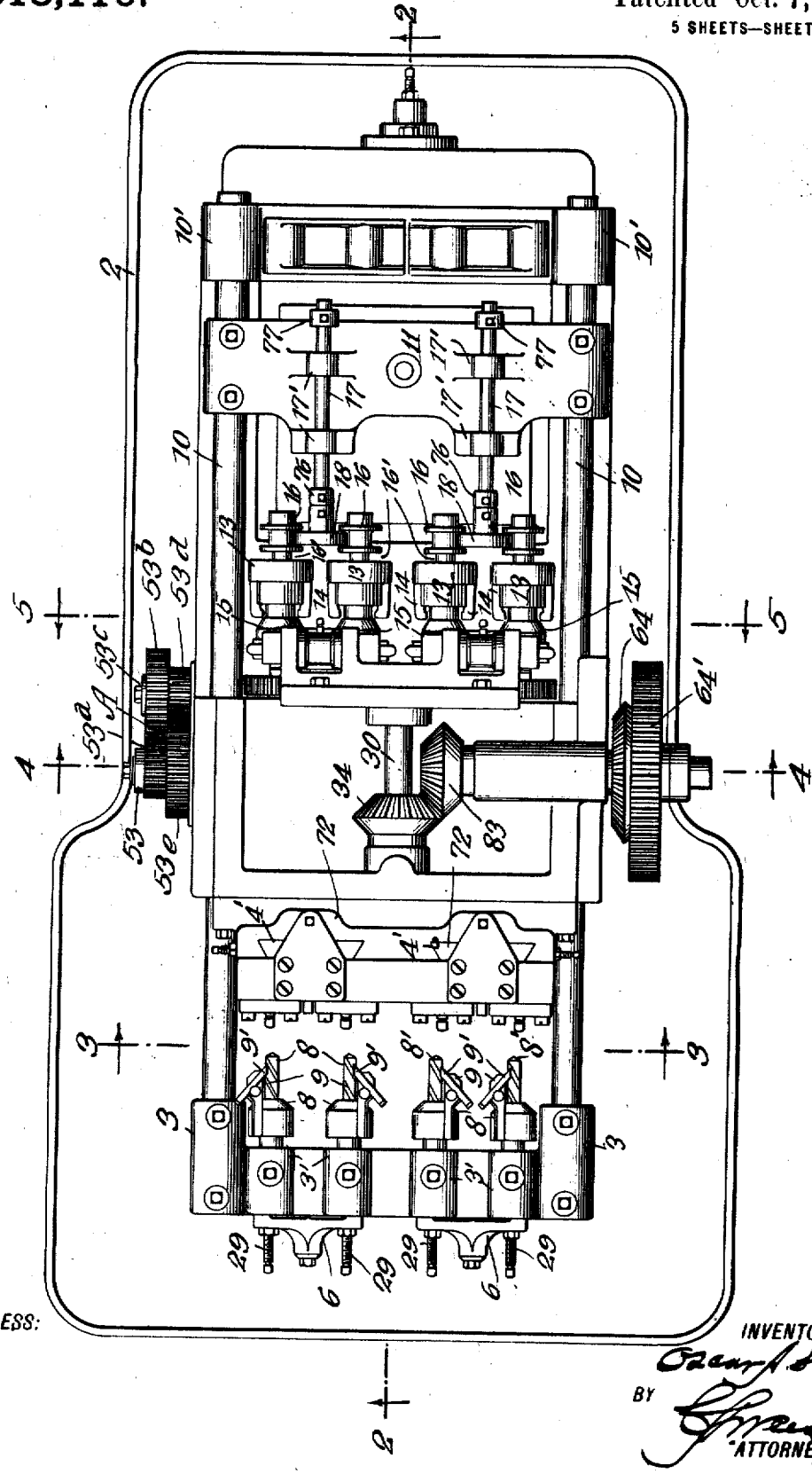

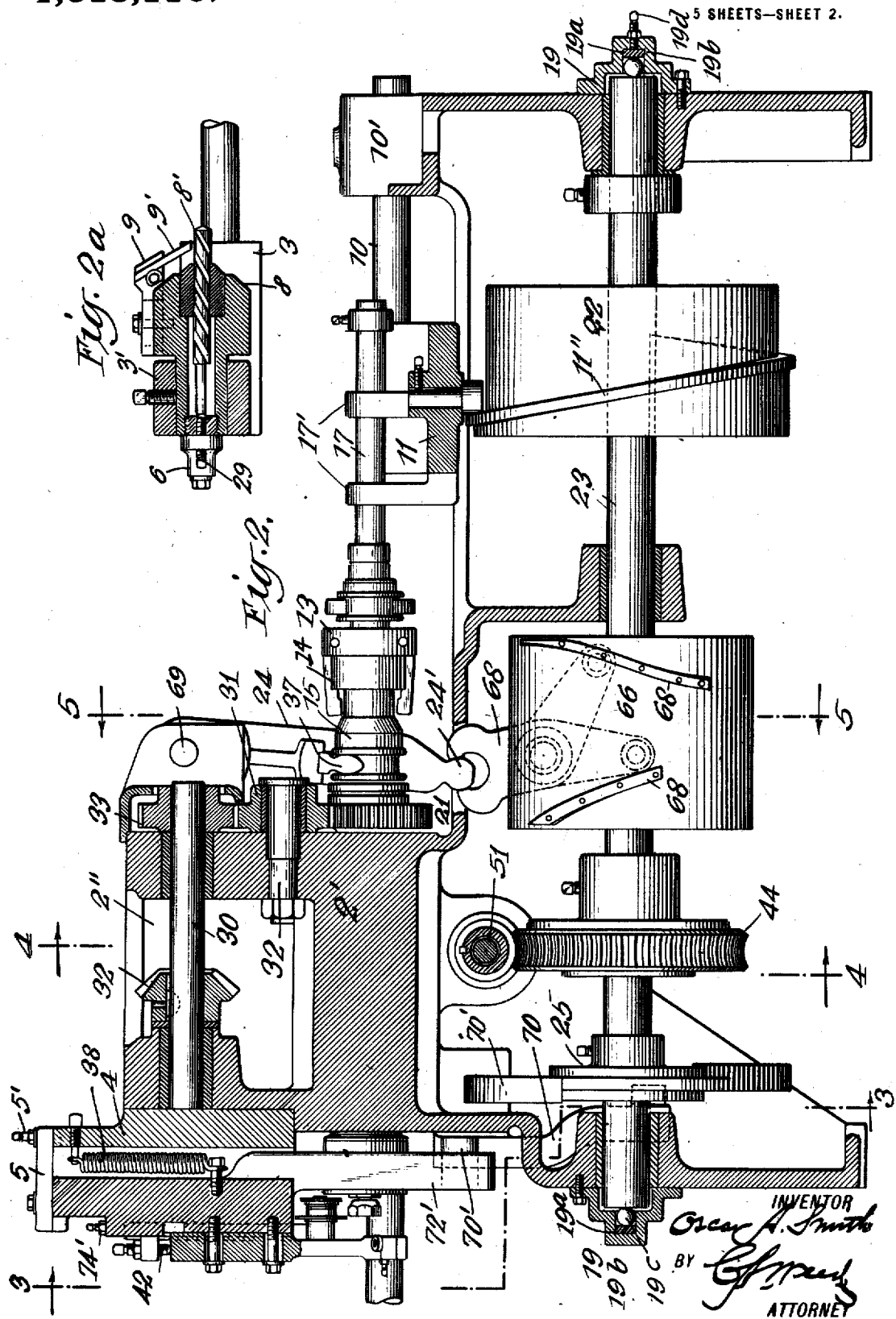

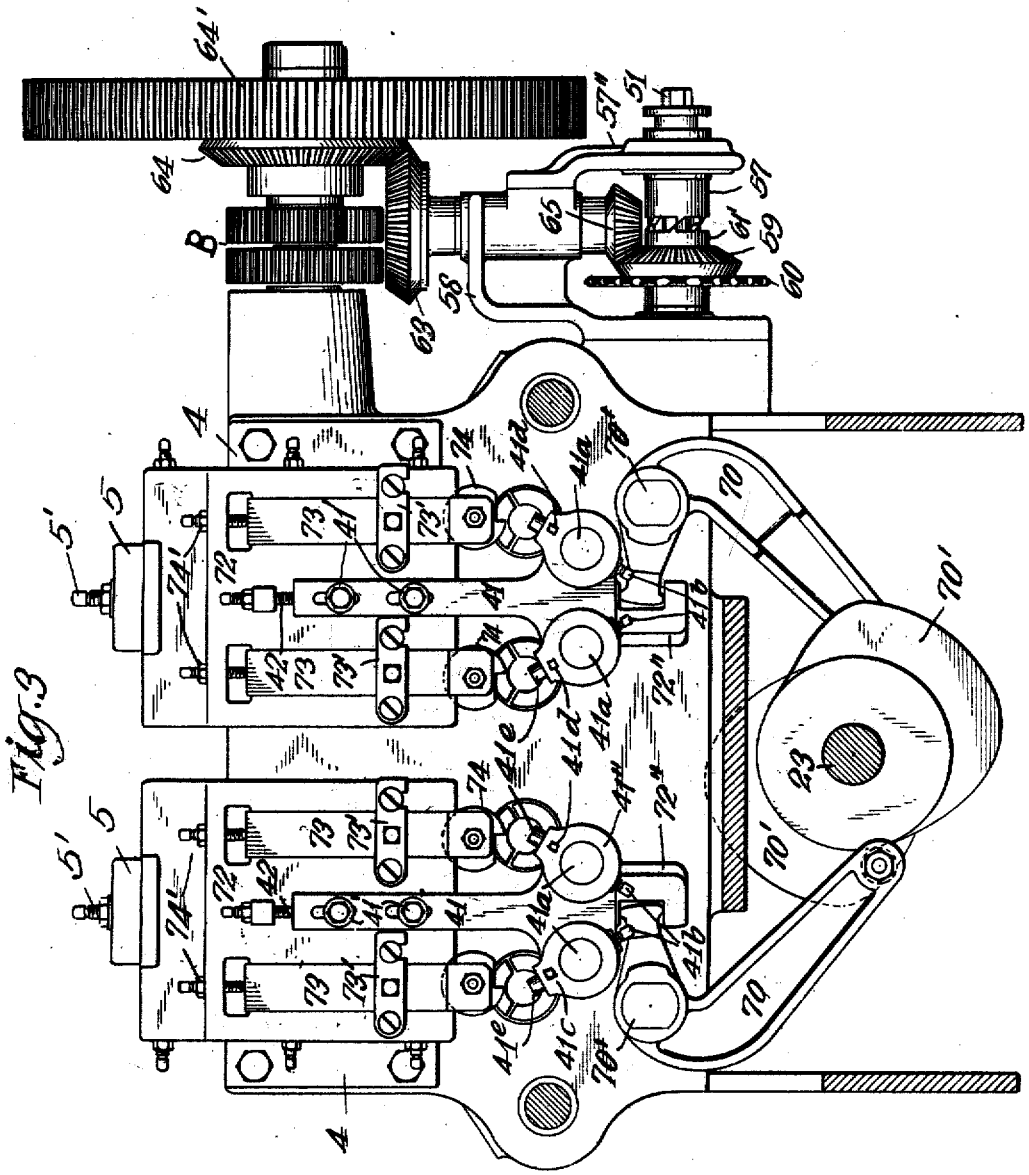

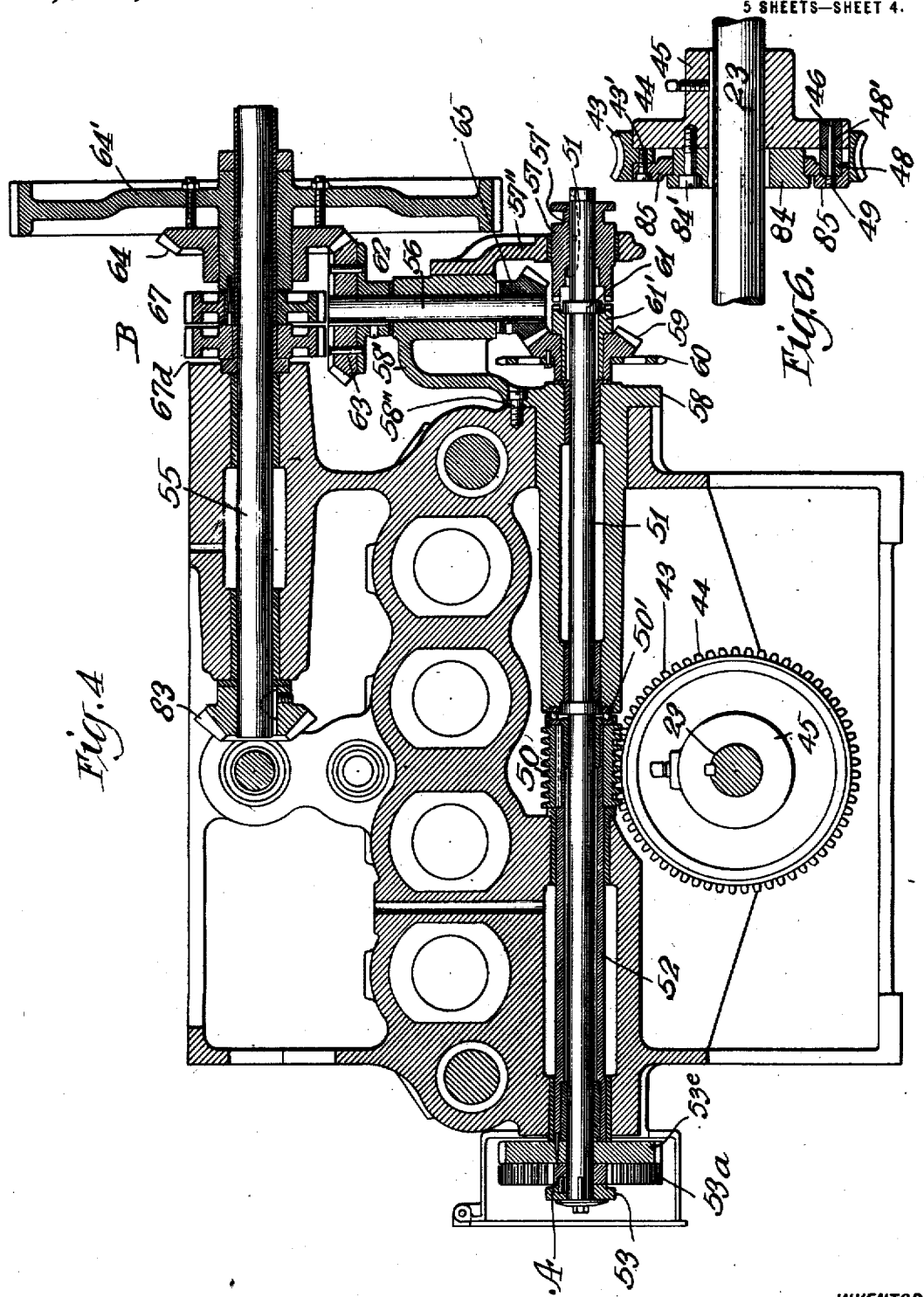

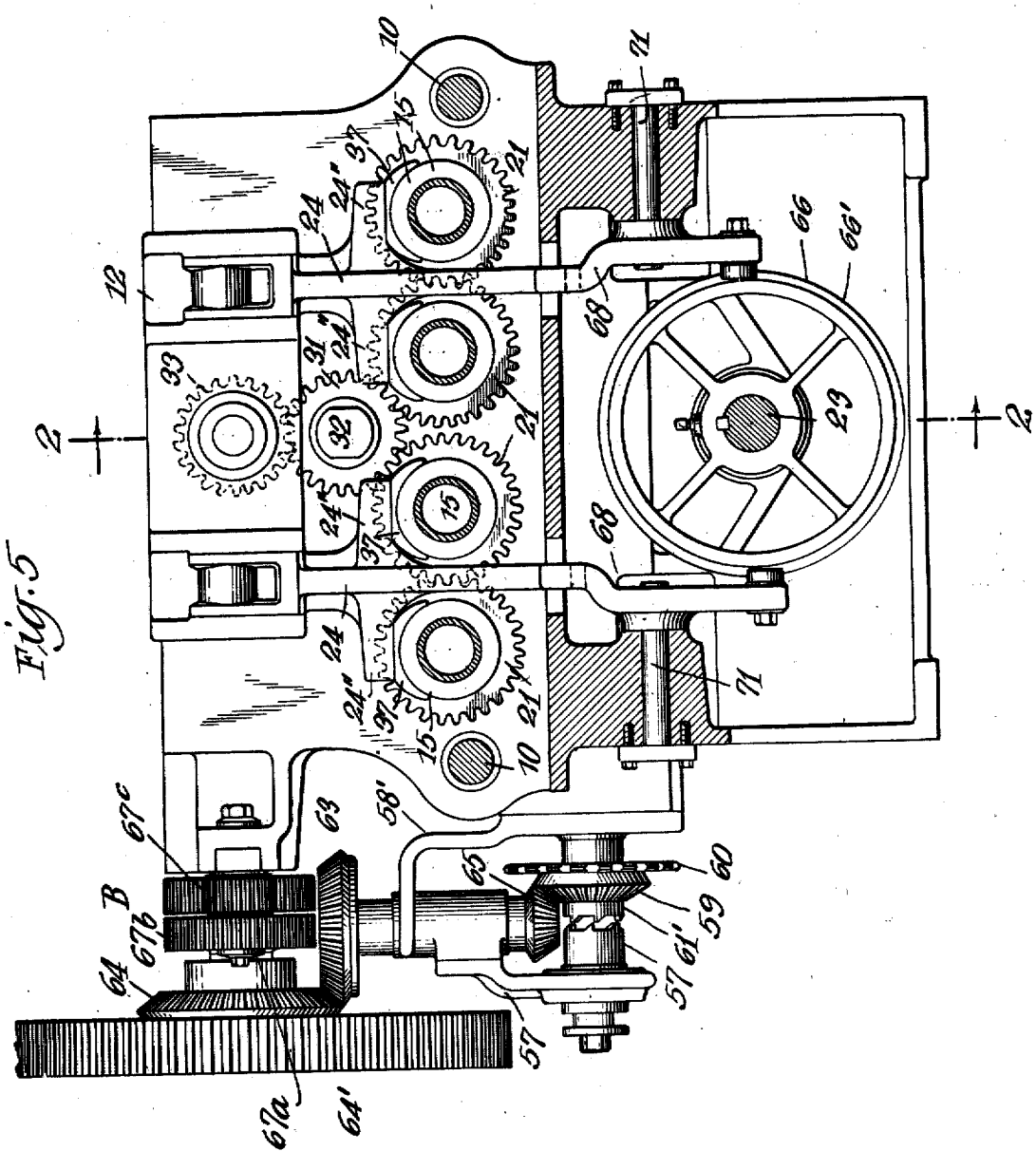

UNITED STATES PATENT OFFICE.

OSCAR A. SMITH, OF CLEVELAND, OHIO, ASSIGNOR TO THE NATIONAL ACME COMPANY, OF CLEVELAND, OHIO, A CORPORATION OF OHIO.

MULTIPLE-SPINDLE LATHE.

1,318,116.  Specification of Letters Patent.  Patented Oct. 7, 1919.

Application filed November 24, 1917. Serial No. 203,672.

*To all whom it may concern:*

Be it known that I, OSCAR A. SMITH, a citizen of the United States, residing at Cleveland, in the county of Cuyahoga and State of Ohio, have invented certain new and useful Improvements in Multiple-Spindle Lathes, of which the following is a specification.

This invention relates to lathes of the multiple spindle type, an important object thereof being to provide an automatic multiple spindle lathe in which all the tools thereof are pulled to the work instead of as heretofore, being pushed into the work, thus providing an entirely new mode of procedure or method for operating upon the work, which is very powerful in its action, and also to provide a machine of this type economical to manufacture and economical and easy to keep in alinement and in which the tools can be readily and quickly adjusted, and in which also the moving parts, such as the forming slide and drilling slide for operating the forming tools and drilling tools are located away from the chips.

Another object of the invention resides in an improved safety mechanism between the cam shaft and the mechanisms operated thereby, whereby when something unforeseen happens, the tool breaking or jamming, or a cam catching thereby placing an extra strain on the cam shaft, this safety mechanism will operate and relieve such strain as well as result in a great saving in the breakage of parts.

A further object of the invention resides in an improved machine of the multiple spindle type, wherein the feeding of the drills and the feeding of the stock are combined in one unit, thereby doing away with an independent means or slide for each of these feeding mechanisms and thereby not only simplifying the machine but making it much more economical to build.

Heretofore it has been the practice in metal working machines having work spindles and sliding tools for operating upon the work in the work spindles to push such tools into the work. In the present improvement, however, the tools, for instance the drills, are pulled instead of being pushed into the work, and there are many advantages for this construction over the old types of machines referred to. One of the advantages is that all danger of the tools "hogging" in is eliminated. If the tools have a tendency to "hog" they will pull away instead of pull into the work.

Another advantage resides in the fact that this mode of procedure facilitates getting at the tools as the operator can stand in front of the machine and watch the tools work and get at any of the tools without going from one side of the machine to the other as has been necessary heretofore.

Another advantage resides in the fact that the chips from the work are prevented from getting in contact with or foul of any of the mechanisms because all of the operative means for pulling the end and side tools into the work are located at the rear of the machine and not adjacent to where the tools are working upon the work while the side tools are supported above the work instead of at the sides thereof as heretofore, and therefore the chips and also the work when finished can fall directly into the pan where they will not interfere with any of the operating mechanisms.

Another advantage is that the bearings for the pull shafts which operate the tools can be readily removed when they wear and new ones substituted therefor without in any way affecting the alinement or again requiring reboring of the bearings.

The foregoing are the important but by no means all of the advantages resulting from a machine constructed in accordance with the present improvement as has been actually demonstrated in practice by using a machine of this type.

In the drawings accompanying and forming a part of this specification,

Figure 1 is a top or plan view of the present improved machine with the motor driving mechanism which may be used removed; Fig. 2 is a longitudinal sectional view taken on line 2—2 of Fig. 1 and also of Fig. 5 and looking in the direction of the arrows with the front end of the machine omitted; Fig. 2ª is a sectional view on line 2—2 Fig. 1 of the omitted end of the machine; Fig. 3 is a front partially cross sectional view of the machine with the drill block removed, the section being taken on line 3—3, Figs. 1 and 2 and looking in the direction of the arrows; Fig. 4 is a cross sectional view taken on line 4—4 Figs. 1 and 2 and looking in the direction of the arrows; Fig. 5 is a rear partially cross sectional view taken on lines 5—5 Figs. 1 and 2 and looking in the direction of the arrows; and Fig. 6 is a detail sectional view of this improved safety mechanism shown attached to the worm wheel of the cam shaft.

Similar characters of reference indicate corresponding parts in the several figures of the drawings.

As a preface to a further description of the present improvement, it will be understood that the machine may be driven from any suitable source of power, one of the sources being a suitable motor mounted upon the machine, and in this instance a gear hereinafter described and in position and adapted to be driven by a motor gear is shown, it not being deemed necessary to show the mounting of a suitable motor for driving the machine.

It will also be understood that while the present machine is shown carrying tools adapted for the making of nuts, such as castellated or plain nuts, which requires the use of a circular forming tool having a forming portion and a cut-off portion, drills and a blade for removing the bur at the front of the hole in the nuts, that nevertheless the machine may be used for various kinds of work.

In the present improvement, it will be understood that all of the tools work at the same time on all of the spindles, four tool spindles and likewise four work spindles being shown as well as four combined forming and cut-off tools and four work stops, but that the improved mechanism herein shown may be used in connection with any desired number of work spindles and tools, and in fact the various details may be more or less changed without departing from the scope or spirit of the claims.

This improved machine in the preferred form thereof comprises a suitable pan, connected to which is a bed 2, and this pan may have attached thereto suitable removable chip guards.

Near the front end of the machine the bed 2 has an upwardly extended portion 2' in which are housed the work spindles and above the work spindles the bed is hollow or box shaped as at 2''. To the front side of this box shaped portion is bolted the slide unit carrying in the present instance the forming and cut-off tools and to the rear of this box shaped portion is bolted the work spindle locking and unlocking wedge operating unit and in the center of this hollow or box shaped portion of the bed certain gears are located for driving the work spindles. This box shaped construction of the bed makes the spindles very accessible for the purpose of lubricating the same. At the rear of the bed a suitable distance apart are two extended bearings located in alinement with bearings at the front outer end of the bed and these bearings act as guideways for the drill table pull rods hereinafter explained. Carried by the bed in suitable bearings in each end thereof is a cam shaft 23 (see Fig. 2). To the outside of the bed at each end thereof and bolted in line with the end of the cam shaft are thrust sockets 19, each having on its inner side a bore or recess 19$^a$ for the reception of a hardened plate 19$^b$ and a ball 19$^c$. Into one of these sockets 19 is housed a set screw 19$^d$ in position to engage the hardened plate 19$^b$. The balls in the socket are in position to engage the ends of the cam shaft and by adjusting the screw 19$^d$ the lengthwise play of the cam shaft will be quickly taken up in a manner which will be readily understood and when the screw 19$^d$ is properly adjusted its adjustment will be maintained by a nut 19$^e$. The foregoing thus provides an anti-friction adjustment for holding the cam shaft in position against lengthwise play.

The work spindles hereinafter referred to are as hereinbefore stated, housed in the upwardly extending portion 2' of the bed and are located in parallelism with the cam shaft. In suitable bearings of the bed 2 between the work spindles and the cam shaft and extending at right angles thereto is housed the worm shaft 51 (see Fig. 4) for driving the cam shaft. Mounted in the bed 2 and extending through a suitable bore of the same so as to project into the bed the desired distance is a hollow cam shaft sleeve or bracket 58, which bracket acts as a bearing for one portion of the worm shaft 51. This bracket 58 is provided with an upwardly extending right angle portion 58' bolted to the bed as at 58'' and carried by this upwardly extending portion 58$^x$ of the bracket is a pinion shaft 56. A sleeve 52 having a bearing in a bore of the bed forms a bearing for the other end of the worm shaft 51. To the inner end of this sleeve 52 is keyed a worm 50 adapted to mesh with the worm wheel 44 hereinafter described on the cam shaft 23. A ball thrust 50' is housed between the inner end of the bracket 58 and the inner end of the sleeve 52 and to the outer end of the sleeve 52 and the worm shaft 51 are fastened suitable gears of a change gear set A, whereby the speed of the worm shaft 50 may be varied as occasion may require. The end of the worm shaft 51 has a collar 53 fastened thereto and one of the change gears as 53$^a$ of the set of change gears A is fastened to this collar and this change gear 53$^a$ meshes with a gear 53$^b$ mounted on a sleeve loosely mounted on a stud 53$^c$. This stud is supported by a sliding bearing located in a suitable slot machined in the side of the bed, so that it can be shifted toward and from the worm shaft thereby to accommodate different sizes of gears in a manner which will be readily understood and which feature is unnecessary to show since it is well known in National Acme machines. To this gear 53$^b$ is pinned a pinion 53$^d$ which meshes with a gear 53$^e$ pinned to the sleeve 52, into which the worm shaft 51 projects. By means of this change gear system it will be seen that when worm shaft 51 is rotated the sleeve 52 will be rotated and through the worm 50 thereof the worm wheel 44 will be driven to drive the cam shaft 23. On the opposite end of the worm shaft 51 so as to bear against the outer face of the bracket 58 is loosely mounted clutch sleeve 61', this clutch sleeve being held in position against the bracket 58 by a collar 61 pinned to the worm shaft 51. Mounted on the clutch sleeve 61' by means of a key is a bevel gear 59 and to the back face of this bevel gear is suitably secured a chain sprocket 60. Mounted on the end of the worm shaft 51 by means of a key and key-way is a sliding clutch sleeve 57. The opposed face of the clutch sleeves 57 and 61' have suitable mating teeth. A suitable safety lever 57' is carried by the clutch sleeve 57 but as this element is well known in National Acme machines a detailed description thereof is deemed unnecessary. When necessary the cam shaft can be turned over or operated by the worn shaft 51 by means of a handle or hand lever, which is attached to the outer squared end of the worm shaft 51 adjacent to the clutch 57. The clutch 57 is housed in an extended bearing 57'' bolted to the bracket 58', and thus this bracket 57'' acts as a support for the outer end of the cam shaft 51. As the clutch 61' is loosely mounted on the worm shaft 51 it can run continuously from the driving gear 64' hereinafter described without rotating the worm shaft 51 or the cam shaft 23, but when the clutch sleeve 57 is shifted by a suitable clutch shifter or shifting mechanism or hand lever, not shown, into engagement with the loosely mounted clutch member 61', then the worm shaft 51 will be rotated and therefore of course the cam shaft 23. To the lower end of the pinion shaft 56 so as to mesh with bevel gear 59 on the worm shaft 51 is located a bevel gear 65 and to the upper end of this pinion shaft 56 and resting against a thrust washer 62 is keyed a bevel gear 63, which is in mesh with a bevel gear 64 keyed to the hub of a motor driven gear 64' (see Figs. 3, 4 and 5) and in mesh with this motor gear 64' will be the usual motor driven gear when an electrically driven motor is used for driving the machine. When however, other power is used, a belt pulley will be substituted for the driving gear 64'. The driving gear 64' or the driving pulley as the case may be, is mounted on a spindle driving shaft 55, which extends transversely into the upright portion 2' of the bed (see Fig. 4). This shaft extends in parallelism with the worm shaft 51 and therefore transversely to the cam shaft 23. Loosely mounted on this drive shaft 55 but connected with the hub of the motor gear 64' by suitable pins is a gear 67 constituting one gear of a set of change gears B. In parallelism with the driving shaft 55 and secured to the bed 2' is a change gear stud 67$^a$ (see Fig. 5) carrying a gear 67$^b$ in mesh with gear 67 and a pinion 67$^c$ pinned to gear 67$^b$ and in mesh with a gear 67$^d$ keyed to the shaft 55. The gears 67$^b$ and pinion 67$^c$, which are pinned together, run loosely on the stud 67$^a$ which may be made adjustable like the stud of change gear set A. By changing the gears of this change gear set B or supplying gears with a different number of teeth and properly arranging them different speeds can be given to the shaft 55 without changing the speed of the driving gear 64' or pulley as the case may be. Of course the change gears B could be dispensed with if desired, and in fact in Fig. 1 this set of change gears B is omitted, the shaft 55 being then directly driven by the gear 64', which will then be fixed to said shaft. To the inner end of the driving shaft 55,—which incidentally may be termed the "main driving shaft" since it is this shaft which is directly connected with some suitable source of power and from this shaft the various driven mechanisms derive their source of power,—is secured by means of a key, a bevel gear 83 in mesh with a bevel gear 34 secured to the spindle driving shaft 30 mounted in the extended portion 2' of the bed 2, and from which spindle driving shaft the work spindles are rotated and for this purpose a spur gear 33 is secured to the outer end of the shaft 30 (see Fig. 2). Below the spindle driving shaft 30 and housed in the bed extension 2' is a suitable stud 32, on which is loosely mounted a spur gear 31, which gear is in mesh with the spur gear 33 and also with two spindle driving gears 21, one located on each of the center spindles, and which gears 21 are in mesh with similar gears 21 of the two outer spindles, four spindles in the present instance being shown (see Fig. 5). Thus the work spindles are driven from the driving gear 64' through the change gears B, meshing bevel gears 83 and 34, spindle driving shaft 30 and spur gears 33, 31 and 21.

Bolted to the front end of the bed 2' directly above the work spindles, is the forming and cut-off slide rest 4 (see Figs. 2 and 3). Into this slide rest are machined two dove-tail slideways 4' (see Fig. 1) for the reception of two slides 72, which are maintained in their slideways by means of suitable gibs and screws. Each of these slides is provided with a downwardly extended portion 72' (see Fig. 2), each projecting between a pair of spindles and to a suitable distance below the same, and the lower end of each of these downwardly extending portions 72' is provided with a square portion or hook 72''. Carried by a pair of studs 70' is a pair of pivoted slide operating levers 70, each of which has an end projecting into the squared or hooked portion 72'' of the downwardly extending portion 72' of a slide 72 and the lower ends of these levers are in contact with suitable cams 70' on a cam disk 25 carried by the cam shaft 23. Thus, the slides 72 are shifted up and down from the cam shaft 23 by the means just described to bring the forming and cut-off tools into engagement with the work and to carry the same away therefrom. Directly above each work spindle and mounted in suitable grooves provided therefor in the two slides 72 are housed the forming and cut-off tool holders 73 shown herein as four in number, these holders being secured to the slides by means of suitable clamps 73' and clamp screws. To the lower end of each of these holders is bolted the forming and cut-off tool 74 the working or cutting edges of which are shown located one behind the other, the cutting-off tool being shown in the rear of the forming tool (see Fig. 2), and at the upper end of each of the holders 73 suitable adjusting screws 74' are carried by the slides 72 for adjusting the depth of cut of the forming and cut-off tools. Midway between and in front of each pair of forming and cut-off tool holders 73 is a stock stop bar 41, this bar being located in a suitable groove machined in the face of its slide 72 and is provided at its lower end with extended portions or bearings 41'' projecting to the right and left of the bar 41 to support the stock stops about to be described. The bar 41 is provided with elongated slots so that it is adjustably supported by bolts 41' on its slide 72 and therefore movable therewith and this bar is adjustable by means of a screw 42 secured in a post projecting from the front of its slide 72. In each extended bearing 41'' of a stop bar 41 is housed an adjustable roller shaft 41$^a$ and the upper portion 41$^d$ of each of the extended bearings 41'' is machined at a suitable angle, and a suitable slot or recess is formed in the rear side of the upper portion of each extended bearing 41'' and at right angles to the angled face 41$^d$. A roller stud is carried by each of the shafts 41$^a$ and projects through the slot or recess just referred to in the bearing 41'' and carried by the upper end of this stud and resting against the angled face 41$^d$ is a roller 41$^e$. A binder screw 41$^b$ is housed at the underside of the extended bearing 41'', and so binds the shaft 41$^a$ in position. An adjusting screw 41$^c$ is housed in the upper portion of the extended bearing 41'' and engages the roller stud. By loosening the binder screw 41$^b$ and manipulating the screw 41$^c$, the stud with its roller 41$^e$ can be adjusted forward and backward together with the shaft 41$^a$, and clamped in the desired position, or by means of the roller shaft 41$^a$ the stud and its roller 41$^e$ may be shifted sidewise should occasion require. These stops regulate the distance that is required for the work or stock to feed forward when the machine is operated and the rollers eliminate all danger of the stock or work spinning or roughing up when it is fed against them. In a suitable recess of the slide rest 4 (see Fig. 2) are located return tension springs 38, the upper ends of which are fastened to the slide rest 4 by suitable screw pins, while the lower ends are fastened to the slides 72 and when the slides are operated these springs have a tendency to take up the shock of the tools when cutting on square or hexagonal stock, and thus steady the cut. They act much in the same way as snubbers on an automobile.

To the upper portion of each slide 72 is bolted stop plate 5 (see Figs. 2 and 3) and these stop plates have a rearwardly extended portion projecting over the slide rest 4 and located in each of these rear extended portions is an adjustable screw 5', which is adjusted to permit the proper sliding movement downwardly of the slides 72, and thus acts to arrest the downward travel of these slides 72 when the forming tools have cut the required depth.

One of the advantages of having the forming and cut-off tool slides located above the work and the drills in the manner shown, is that all danger of chips getting into these tool slide bearings or cutting compounds that have no lubricating qualities running into such tool slide bearings, is entirely eliminated, whereas in prior machines the forming and cut-off tool slides were located at the sides of the machine in such position that the chips flying off from the work would not infrequently get into the bearings, as would also portions of the cutting compounds, thus endangering and materially interfering with the proper work thereof.

To the rear of the extended portion 2' of the bed 2 and a suitable distance above the work spindles is bolted the wedge operating lever bracket 12 (see Fig. 5). Pivoted to suitable projections of this bracket 12 by means of suitable pins 69 (see Fig. 2) is a pair of wedge operating levers 24. Each lever extends downwardly between a pair of work spindles to a suitable distance below the same and the lower end of each lever is formed with a semi-circular head 24'. Directly above each pair of work spindles are located oppositely extending portions 24'' formed on or connected with a wedge operating lever 24, each of these right and left extending portions 24″ being located over the center of each wedge 15 of a work spindle and into the lower face of each of these extended right and left portions and directly over the wedge 15 are housed suitable bronzed shoes 37, each of which enters a suitable groove of the wedge 15. To the inner sides of the bed in suitable alinement with the wedge operating levers 24 are pivoted on suitable studs 71 (see Fig. 5) a pair of wedge operating levers 68, each provided with a radial slot in its upper end for the reception of the semi-circular head of the levers 24. The lower ends of these levers 68 are provided with studs and rollers in position to contact with suitable cams 68′ on a cam drum 66 (see Figs. 2 and 5) mounted on the cam shaft 23. Each wedge lever thus operates upon two work spindles and the mechanism shown herein provides a very powerful organization for this purpose.

On each side of the bed a suitable distance away from the two outer work spindles and a little below and parallel with the same is located a pair of endwise movable shafts or rods designated herein as pull rods or drill table pull rods 10. These rods are housed for sliding movement at the rear end of the machine in bearings 10′ carried by the bed 2 and they are also supported by bearings in the bed 2 at each side of the cut-off and forming tools (see Fig. 3). Secured to the front ends of these rods by suitable set screws is drill table 3 (see Fig. 1) and this drill table is provided with suitable bores 3′ shown as four in number, in line with the work spindles, and in these bores are located drill holders 8 carrying drill bushings of a size to fit the desired size of drill 8′, which is to be used. In the present improvement it will be observed that the work spindles rotate while the drills slide toward and from the work without rotating. Carried in slots of the drill holders are counter-sinking tool holders 9 having angularly formed slots for the reception of the cutters 9′ held therein by suitable clamping bolts and washers. Bolted to the rear of the drill table 3 midway between each pair of drill holders is a backing bracket 6. Each of these brackets is provided with a pair of extensions reaching somewhat beyond the center of the drill holders and each of these extensions carries an adjusting screw 29 in position to engage the rear end of the drills projecting through the rear ends of the drill holders. This backing bracket and plate or screws thus act as an adjustment for the drills and also to back up the drills when cutting.

As hereinbefore stated, the machine is shown provided with tools for making nuts, but when making screws, the drill holders and drills will be replaced by a box tool or a turning tool of any required design. In other words, a tool suitable for the work to be done will be substituted for the drills. Mounted on the rear of the pull rods 10 (see Fig. 1) between the rear ends of the work spindles and the rear bearing 10′ for the pull rods and secured to the pull rods by suitable set screws is a combined drill table and feed operating slide 11 (see Figs. 1 and 2). This slide is provided with two sets of upwardly extended bearings 17′ each pair being located in a line midway between each pair of work spindles and into each pair of bearings is fitted a feed slide bar 17. On the inner end of each of these bars is fastened by means of a hub and set screw, a disk 18 of a suitable width and diameter to fit into the grooved portions of the spools 16 on the end of the feed tubes 16′ of the work spindles, and on each of the bars 17 are located a pair of adjustable collars 76 and 77, one, 76, directly back of the disk 18 and the other on the rear end of the bar, the purpose of which will be explained hereinafter. Secured to the bottom of the slide 11 centrally thereof is a stud and roller 11′ in position to contact with suitable cams 11″ at the proper time on a cam drum 22 carried by the cam shaft 23. This cam drum carries the slide 11 backward and forward and with it the pull rods 10 and therefore the drill table 3. The work spindles designated in a general way as 200 are of the well known National Acme type and each comprises a chuck at its forward end, a feed tube and correlated parts, such as a feed chuck, a wedge 15, a finger block 13, and fingers 14, which fingers 14 operate the push tubes for operating the chucks and therefore a detailed description thereof is not deemed necessary in the present case.

A suitable oil reservoir, usual in multiple spindle machines, will be provided, from which suitable tubes extend to the various bearings of the machine and the oil is pumped through these tubes by a suitable pump which will be driven by the sprocket gear 60 on the worm shaft 51.

A safety mechanism is provided in the present machine for preventing damage thereto. This safety mechanism in the present instance is located on the cam shaft, which is effective when something unforeseen happens, as a tool breaking or jamming or a cam catching and thereby placing an extra strain on the cam shaft to relieve such strain and prevent the breakage of those parts of the machine operated by the cam shaft. This safety mechanism in the present instance is located, as stated, on the cam shaft and coöperates with the worm wheel 44 so that in the event of something unforeseen happening the worm wheel can continue to rotate without rotating the cam shaft. Referring to Figs. 6 and 2, the cam shaft has fastened thereto a worm wheel hub or disk 45, this member being keyed and bolted tightly to the cam shaft 23. The worm wheel proper consists of a bronze ring or rim 43 having suitable teeth on its periphery to mesh with the worm 50 of the worm shaft 51. This worm wheel ring is provided with an inwardly extending flange 43' midway between the sides of the ring. One side of the worm wheel ring fits upon the periphery of the hub or disk 45 with the flange 43' resting against the front face of this hub 45. A driving or retaining plate 85 fits into the opposite side of the worm wheel 43 and is bolted to the flange 43' thereof. This retaining plate 85 has a suitable bore, into which is freely fitted a flanged clamping plate 84 which is bolted by suitable bolts 84' to the hub or disk 45 thereby holding the plate 85 and the worm wheel 43 assembled tightly with the hub 45, which is fastened to the cam shaft. At a suitable distance apart and into the front face of the disk or hub 45 are inserted two hardened bushings 46, each having an opening of a suitable diameter for the reception of a safety pin. The retaining plate 85 likewise has inserted therein directly opposite these two bushings in the hub 45, two hardened steel bushings 48 with a center opening of the same diameter as that in the bushings of the hub and carried by the bushings 46 and 48 are a pair of pins 48', and these pins 48 are backed up by screws 49 located in the plate 85. If a strain greater than these pins will stand is placed upon the mechanism of the machine, the pins will shear and as the worm wheel ring 43 is fastened tightly to the driving or retaining plate 85 and both therefore held in position on the periphery of the hub or disk 45 by the clamping plate 84, it follows that the worm wheel will rotate relatively to the hub 45 without rotating the hub 45, and therefore without rotating the cam shaft 23, so that the cam shaft remains idle until the broken pins have been removed and new ones inserted, and therefore the mechanisms operated by the cam shaft remain inoperative. In the present construction therefore, it will be observed that the worm wheel 44 comprises a hub and a toothed ring which are assembled to normally rotate together thereby to rotate the worm shaft 23, but that in case of accident the toothed portion of the worm wheel can rotate independently of its hub, so that no rotary movement to the cam shaft will be imparted.

In the operation of the machine, it will be understood that after the four stock bars have been suitably drilled and that as the drills are receding away from the drill bars, the slides 72 are rapidly brought downward to have the cut-off tools thereof sever the drilled nuts from the stock bars, and that these slides 72 continue to move downward at this time, so that the forming tools will form a new nut on the free ends of the stock bars and that as the cut-off and forming tools are moved downward the stop rolls for limiting the forward movement of the stock bars are likewise carried downward, being carried by the same slide 72, away from the stock bars, and that when the cut-off and forming tools are moved upward the stop rolls are again brought into position to limit the forward movement of the stock bars.

It will also be seen that as the drills are moved forward to engage the stock bars by means of the slide 11 and the cam operated mechanism hereinbefore described, the feed tubes are carried rearwardly or to the right (Fig. 1) by means of the disks 18 and rods or shafts 17 carried by the slide 11 and into position to feed the bars of stock forwardly against the stop rolls at the proper time, and that when the drills recede from the work or are moved to the left (Fig. 1) by the movement of the slide 11 forwardly toward the left, then the feed tubes are pushed forwardly, the feed chucks having been properly closed on the work to push the bars of stock forward into engagement with the feed stops.

Assuming that each of the cut-off tools of the slides 72 has severed a finished piece from each of the four bars of stock in the work spindles, the slides 72 continue to feed downward so that the forming portion of each circular tool will form another nut on the free ends of the four bars, whereupon the slides 72 are quickly moved upward to permit the stock bars to be fed forward against the stop rolls, this upward movement of the slides 72 of course carrying the stop rolls with them into position to limit the forward movement of the stock bars, the stop rollers of course having been suitably adjusted to limit the forward movement of the stock bars, whereupon the stock bars are fed forward by the slide 11 and the shafts or rods 17 and disks 18 as the drills are carried away from the work which they have just previously drilled. Thereupon the slides 72 are carried downwardly just far enough to allow the stop rollers to clear the ends of the stock bars in the work spindles, during which movement the drill table and drills are pulled forward by means of the slide 11 to carry the drills quickly up to the stock bars and into the same. In practice, one cam on the cam drum 22 pulls the drills up to the stock bars, while another cam thereon pulls the drills into the stock bars. When the drills have entered the bars the desired distance the slides 72 then continue to move downward so as to carry the cut-off tools into position to cut off the finished nuts. Before this operation takes place however, the drills have been again pushed away from the stock bars, in other words, they have receded to their initial position to permit the nuts to be cut off, whereupon after the nuts have been cut off the continued downward movement of the slides 72 brings the forming tools into position to form new nuts on the free ends of the bars as hereinbefore explained.

It is understood of course, that the slide 11 travels backward and forward a predetermined distance for pulling the drills up to the work and into the same the required distance and for carrying the drills away from the work to clear the drills therefrom. This distance is fixed. The collars 76 and 77 on the shafts or rods 17 carried by the slide 11 are adjusted on these shafts a suitable distance away from the extended bearings 17' of the slide 11 to permit the proper amount of feed to the feed tubes carrying the bars to be operated upon, and when the drills are fed forward into the ends of the bars due to the movement of the slide 11 toward the rear or to the right (Fig. 1) of the machine, it will be obvious that the feed tubes by means of the disks 18 carried by the shafts or rods 17 will likewise be carried rearwardly over the stock bars the required distance that the stock is to be subsequently fed forward, owing to the engagement of the rear bearings 17' with the collars 77 of the rods 17, so that when the work has been drilled and the drills are moved backward and away from the work the forward movement of the slide 11 will carry the forward bearings 17' into engagement with the collars 76 on the rods 17 and thus carry the feed tubes forward by means of the disks 18 to feed the stock bars the required distance forward and into engagement with the stop rolls. Of course it will be understood that the feed tubes have the regular National Acme feed chucks to grip the bars and to effect this result, it of course being understood that the work spindle chucks have been suitably opened or released to permit this forward feeding of the stock bars and that the stop rollers have been in the meantime positioned to limit the forward movement.

In conclusion, it will therefore be seen that the feeding of the stock bars and the drilling thereof is obtained through the medium of a single slide operated from the cam shaft 23 by suitable cam mechanism, and that the stock bars are fed forwardly into position to be drilled as the drills recede from the work and that as the drills are pulled toward and into the work by the slide 11 the feeding mechanism for the stock bars is carried with the slide 11 into position toward the right (Fig. 1) in readiness to feed forward the bars again after the set of nuts has been drilled and severed from the bars. Thus, instead of using one slide and mechanism for feeding the bars and another slide and mechanism for feeding the drills, I am able to accomplish both of these operations by a single slide and its correlated cam mechanism. In other words, by reason of the lost motion of the rods or shafts 17 relative to the bearings 17' of the slide 11 and the proper cam timing a single unit or slide is possible for feeding the drills and feeding to stock bars thereby very much simplifying the mechanism and making the machine more economical to build.

I claim as my invention:

1. In a machine of the class described, the combination of work supporting means, an endwise working tool supported in position to engage the work, means for rotating the work and the tool, one relatively to the other, and means for pulling the work and the tool one relatively to the other into engagement and including means located at each side of the tool and the work.

2. In a metal working machine, the combination of a work spindle, an endwise working tool in alinement with the work spindle, means for rotating one of said parts, means for pulling one of said parts into engagement with the other, and means for feeding the stock through the work spindle from the rear thereof and toward the tool.

3. In a machine of the class described, the combination of a work spindle, an endwise operating tool, means for rotating the work spindle and the tool one relatively to the other, means for pulling the work spindle and the tool one relatively to the other into engagement, means for feeding the stock through the work spindle from the rear thereof toward the tool, a side working tool supported above the work spindle and shiftable up and down into engagement with the work, and means for pulling said side working tool into engagement with the work.

4. In a multiple spindle machine, the combination of a plurality of work spindles, means for feeding work through the spindles from the rear thereof toward the tools, a plurality of endwise working tools located in alinement with said work spindles, means for rotating the work spindles and the tools one relatively to the other, and means for pulling the work spindles and the tools into engagement one relatively to the other.

5. In a machine of the class described, the combination of a work spindle, an endwise operating tool, means for rotating the work spindle and the tool one relatively to the other, means for pulling the work spindle and the tool one relatively to the other into engagement, a side working tool supported above the work spindle, means for shifting the same into and out of engagement with the work, and a work stop shiftable with said side working tool.

6. In a multiple spindle machine, the combination of a plurality of work spindles, means for feeding work through the spindles from the rear thereof toward the tools, a plurality of endwise working tools located in alinement with said work spindles, means for rotating the work spindles and the tools one relatively to the other, means for pulling the work spindles and the tools into engagement one relatively to the other, a plurality of side working tools shiftable up and down toward and from the work, and means for pulling said side working tools into engagement with the work.

7. In a multiple spindle machine, the combination of a plurality of rotatable work spindles, means for rotating the spindles, a plurality of slidingly supported endwise working tools corresponding in number with said work spindles, means operative to shift said tools and pull the same into engagement with the work, a plurality of side working tools corresponding in number with the spindles and supported above said spindles, means for shifting said side working tools into engagement with the work, and work stops movable with said side working tools.

8. In a multiple spindle machine, the combination of a plurality of rotatable work spindles, means for feeding the work through the spindles from the rear thereof toward the tools, means for rotating the spindles, a plurality of slidingly supported tools corresponding in number with the work spindles, and means operative to shift the tools and pull the same toward and into engagement with the work.

9. In a multiple spindle machine, the combination of a plurality of rotatable work spindles, means for feeding the work through the spindles from the rear thereof toward the tools, means for rotating the spindles, a plurality of slidingly supported endwise working tools corresponding in number with said work spindles, means operative to shift said tools and pull the same into engagement with the work, a plurality of side working tools also corresponding in number with the work spindles and supported above said spindles for movement up and down toward the work, and means for shifting said side working tools into engagement with the work.

10. In a multiple spindle machine, the combination of a plurality of rotatable work spindles, means for feeding the work through the spindles from the rear thereof toward the tools, means for rotating the spindles, a plurality of slidingly supported tools corresponding in number with said work spindles, means operative to shift the tools and pull the same toward and into engagement with the work, a plurality of forming and cutting tools located above the work spindles and supported for movement up and down toward and from the work, and means for also pulling said forming and cutting tools into engagement with the work.

11. In a multiple spindle machine, the combination of a single bed, a series of work spindles located side by side in a horizontal plane on said bed, means for feeding the work through the spindles from the rear thereof toward the tools, means for rotating said spindles, a slide, a series of endwise working tools carried by said slide and corresponding in number with the number of work spindles and also located side by side in a horizontal plane and in alinement with the work spindles, and means for shifting said slide thereby to pull the tools into engagement with the rotating work.

12. In a multiple spindle machine, the combination of a single bed, a series of work spindles mounted upon said bed in a horizontal plane side by side, means for rotating said spindles, means for feeding the work through the spindles from the rear thereof toward the tools, a slide, a series of endwise working tools carried by said slide and corresponding in number with the number of the work spindles and also located in a horizontal plane side by side and in alinement with the work spindles, means for shifting said slide thereby to pull the tools toward and into engagement with the rotating work, a series of forming and cutting tools supported above the work spindles for movement up and down and corresponding in number with the number of the work spindles, sliding means for supporting said tools, and means for also pulling said tools into engagement with the work.

13. In a metal working machine, the combination of a work spindle, an endwise working tool in alinement with the work spindle, means for rotating one of said parts, means for pulling one of said parts into engagement with the other, and means for feeding the stock through the work spindle, said stock feeding means and pulling means comprising the same mechanism.

14. In a metal working machine, the combination of a work spindle, a tool, means for rotating one of said parts, means for pulling one of said parts into engagement with the other, and means for feeding the stock through the work spindle, said stock feeding means and pulling means comprising the same mechanism and including a single slide.

15. In a metal working machine, the combination of a plurality of rotatable work spindles, means for rotating said spindles, a plurality of sliding endwise working tools coöperating with the work spindles, means for pulling said tools into engagement with the work in the work spindles, and means for feeding the stock through the work spindles, said stock feeding means and tool pulling means comprising the same mechanism and including a single slide.

16. In a metal working machine, the combination of a plurality of rotatable work spindles, means for rotating said spindles, a plurality of tools corresponding with the number of work spindles, a sliding tool carriage supporting said tools, stock feeding means, a slide connected with said tool carriage and with said stock feeding means, and means for operating said slide, thereby to pull the tools into the work and also to operate the stock feeding means.

17. In a multiple spindle machine, the combination of a plurality of rotatable work spindles, means for rotating the spindles, a plurality of slidingly supported endwise working tools corresponding in number with said work spindles, means operative to shift said tools and pull the same into engagement with the work, a plurality of forming and cut-off tools corresponding in number with the work spindles and supported above said work spindles, and means for shifting said forming and cut-off tools into engagement with the work.

18. In a multiple spindle machine, the combination of a plurality of rotatable work spindles, means for rotating the spindles, a plurality of slidingly supported endwise working tools corresponding in number with said work spindles, means operative to shift said tools and pull the same into engagement with the work, a plurality of forming and cut-off tools corresponding in number with the work spindles and supported above said work spindles, means for shifting said forming and cut-off tools into engagement with the work, and a plurality of work stops corresponding in number with the work spindles and movable with said cut-off and forming tools.

19. In a multiple spindle machine, the combination of a rotatable work spindle, a tool for operating upon the work, means for rotating the spindle and shifting the tool, means for feeding the work through the spindle, a work stop, sliding means for supporting said work stop for movement up and down transversely of the work, and means for shifting said sliding means thereby to carry the work stop into and out of position relatively to the work.

20. In a multiple spindle machine, the combination of a plurality of rotatable work spindles, a plurality of tools corresponding in number with the work spindles for operating upon the work, means for rotating the spindles and shifting the tools, means for feeding the work through the spindles, a plurality of work stops corresponding in number with the number of work spindles and shiftable up and down to and from the work transversely thereof and normally at rest below the work, sliding means for supporting said work stops, and means for shifting said sliding means thereby to carry the work stops into and out of position relatively to the work.

21. In a multiple spindle machine, the combination of a plurality of rotatable work spindles, means for rotating the spindles, a plurality of slidingly supported endwise working tools corresponding in number with said work spindles, means operative to shift said tools and pull the same into engagement with the work, a plurality of side working tools corresponding in number with the spindles and supported above said spindles, means for shifting said side working tools into engagement with the work, and work stops movable with said side working tools, each of said work stops having a roller for engaging the work.

22. In a multiple spindle machine, the combination of a plurality of rotatable work spindles, means for rotating said spindles, a plurality of slidingly supported endwise working tools corresponding in number with said work spindles, a plurality of side working tools slidingly supported above said work spindles, means for feeding work bars through said spindles, and means including a slide for operating said feeding means and said endwise working tools.

23. In a multiple spindle machine, the combination of a plurality of rotatable work spindles, means for rotating said spindles, a plurality of slidingly supported endwise working tools corresponding in number with said work spindles, a plurality of side working tools slidingly supported above said work spindles, means for feeding work bars through said spindles, and means including a slide for operating said feeding means and said endwise working tools, and effective to pull the endwise working tools into engagement with the work.

24. In a multiple spindle machine, the combination of a plurality of rotatable work spindles, means for rotating said spindles, a plurality of slidingly supported endwise working tools corresponding in number with said work spindles, a plurality of side working tools slidably supported above said work spindles, means for feeding work bars through said spindles, and means including a slide for operating said feeding means and said endwise working tools and effective to pull the endwise working tools into engagement with the work simultaneously with the retraction of the feeding means.

25. In a multiple spindle machine, the combination of a plurality of rotatable work spindles, means for rotating said spindles, a plurality of slidingly supported endwise working tools corresponding in number with said work spindles, a plurality of side working tools slidingly supported above said work spindles, means for feeding work bars through said spindles, and means including a slide for operating said feeding means and said endwise working tools and effective to pull the endwise working tools into engagement with the work simultaneously with the retraction of the feeding means and also effective to push the tools away from the work simultaneously with the feeding of such work.

26. In a multiple spindle machine, the combination of a plurality of rotatable work spindles, means for rotating said spindles, a plurality of slidingly supported endwise working tools corresponding in number with said work spindles, a plurality of side working tools slidingly supported above said work spindles, means for feeding work bars through said spindles, means including a slide for operating said feeding means and said endwise working tools and effective to pull the endwise working tools into engagement with the work simultaneously with the retraction of the feeding means, and shiftable stops for limiting the forward movement of the work.

27. In a multiple spindle machine, the combination of a plurality of rotatable work spindles, means for rotating said spindles, a plurality of slidingly supported endwise working tools corresponding in number with said work spindles, a plurality of side working tools slidingly supported above said work spindles, means for feeding work bars through said spindles, means including a slide for operating said feeding means and said endwise working tools and effective to pull the endwise working tools into engagement with the work simultaneously with the retraction of the feeding means and also effective to push the tools away from the work simultaneously with the feeding of such work, and shiftable stops for limiting the forward movement of the work.

28. In a multiple spindle machine, the combination of a plurality of rotatable work spindles, means for rotating said spindles, a plurality of slidingly supported endwise working tools corresponding in number with said work spindles, a plurality of side working tools slidingly supported above said work spindles, means for feeding work bars through said spindles, means including a slide for operating said feeding means and said endwise working tools and effective to pull the endwise working tools into engagement with the work simultaneously with the retraction of the feeding means, and shiftable stops for limiting the forward movement of the work, said stops being movable with said side tools.

29. In a multiple spindle machine, the combination of a plurality of rotatable work spindles, means for rotating said spindles, a plurality of slidingly supported endwise working tools corresponding in number with said work spindles, a plurality of side working tools slidingly supported above said work spindles, means for feeding work bars through said spindles, means including a slide for operating said feeding means and said endwise working tools and effective to pull the endwise working tools into engagement with the work simultaneously with the retraction of the feeding means and also effective to push the tools away from the work simultaneously with the feeding of such work, and shiftable stops for limiting the forward movement of the work, said stops being movable with the said side tools.

30. In a multiple spindle machine, the combination of a plurality of rotatable work spindles, means for rotating said spindles, a plurality of slidingly supported endwise working tools corresponding in number with said work spindles, a plurality of side working tools corresponding in number with said work spindles and supported above said spindles, a plurality of work stops movable with the side working tools and corresponding in number with said work spindles, a plurality of means corresponding in number with the work spindles for feeding stock through the spindles, and means for pulling the endwise tools into engagement with the work, drawing the side tools into engagement with the work, carrying the work stops into and out of position and feeding the work and comprising cam mechanism including a cam shaft, and a slide coöperating with the endwise tools and the work feeding means.

31. In a multiple spindle machine, the combination of a plurality of rotatable work spindles, means for rotating said spindles, a plurality of slidingly supported endwise working tools corresponding in number with said work spindles, a plurality of side working tools corresponding in number with said work spindles and supported above said spindles, a plurality of work stops movable with the side working tools and corresponding in number with said work spindles, a plurality of means corresponding in number with the work spindles for feeding stock through the spindles, means for pulling the endwise tools into engagement with the work, drawing the side tools into engagement with the work, carrying the work stops into and out of position and feeding the work and comprising cam mechanism including a cam shaft, and a slide coöperating with the endwise tools and the work feeding means, and safety mechanism effective to permit the cam shaft to remain idle under certain conditions.

32. In a multiple spindle machine, the combination of a plurality of rotatable work spindles, means for rotating said spindles, a plurality of slidingly supported endwise working tools corresponding in number with said work spindles, a plurality of side working tools corresponding in number with said work spindles and supported above said spindles, a plurality of work stops movable with the side working tools and corresponding in number with said work spindles, a plurality of means corresponding in number with the work spindles for feeding stock through the spindles, means for pulling the endwise tools into engagement with the work, drawing the side tools into engagement with the work, carrying the work stops into and out of position and feeding the work and comprising cam mechanism including a cam shaft, and a slide coöperating with the endwise tools and the work feeding means, safety mechanism effective to permit the cam shaft to remain idle under certain conditions, and means for taking up endwise play of the cam shaft.

33. In a multiple spindle machine, the combination of a plurality of rotatable work spindles, means for rotating said spindles, a plurality of slidingly supported endwise working tools corresponding in number with said work spindles, a plurality of side working tools corresponding in number with said work spindles and supported above said spindles, a plurality of work stops movable with the side working tools and corresponding in number with said work spindles, a plurality of means corresponding in number with the work spindles for feeding stock through the spindles, means for pulling the endwise tools into engagement with the work, drawing the side tools into engagement with the work, carrying the work stops into and out of position and feeding the work and comprising cam mechanism including a cam shaft, and a slide coöperating with the endwise tools and the work feeding means, safety mechanism effective to permit the cam shaft to remain idle under certain conditions, and means for taking up endwise play of the cam shaft and including an antifriction ball.

34. In a multiple spindle machine, the combination of a plurality of rotatable work spindles, means for rotating the spindles, a plurality of slidingly supported side forming tools supported above said work spindles and corresponding in number therewith, the cutting faces of each set being located one behind the other, and means for shifting said tools into and out of engagement with the work.

35. In a multiple spindle machine, the combination of a plurality of rotatable work spindles, means for rotating the spindles, a plurality of slidingly supported side forming tools supported above said work spindles and corresponding in number therewith, the cutting faces of each set being located one behind the other, and means for shifting said tools into and out of engagement with the work and comprising a cam shaft and cam mechanism thereon.

36. In a multiple spindle machine, the combination of a plurality of rotatable work spindles, means for rotating the spindles, a plurality of slidingly supported side forming tools supported above said work spindles and corresponding in number therewith, and means for shifting said tools into and out of engagement with the work and comprising a cam shaft and cam mechanism thereon, each of said side working tools comprising a forming and a cut-off tool located one behind the other.

37. In a multiple spindle machine, the combination of a plurality of rotatable work spindles, means for rotating the spindles, a slide, a plurality of side forming tools supported by said slide above said work spindles and corresponding in number therewith, means for shifting said tools into and out of engagement with the work, and a plurality of stops corresponding in number with the work spindles and also carried by said slide and movable with said side forming tools.

38. In a multiple spindle machine, the combination of a sliding tool carrier, a plurality of endwise working tools carried thereby, a slide, pull rods connecting the tool carrier and slide, means for operating the slide, a plurality of rotatable work spindles located between the slide and the tool carrier, means for rotating the work spindles, and means for feeding stock through the work spindles and also connected with said slide.

39. In a multiple spindle machine, the combination of a sliding tool carrier, a plurality of endwise working tools carried thereby, a slide, pull rods connecting the tool carrier and slide, means for operating the slide, a plurality of rotatable work spindles located between the slide and the tool carrier, means for rotating the work spindles, a slide supported above said work spindles, and a plurality of side working tools carried by said slide.

40. In a multiple spindle machine, the combination of a sliding tool carrier, a plurality of endwise working tools carried thereby, a slide, pull rods connecting the tool carrier and slide, means for operating the slide, a plurality of rotatable work spindles located between the slide and the tool carrier, means for rotating the work spindles, a slide supported above said work spindles, a plurality of side working tools carried by said slide, a plurality of stops located below the work spindles, and means for raising and lowering them.

41. In a multiple spindle machine, the combination of a sliding tool carrier, a plurality of endwise working tools carried thereby, a slide, pull rods connecting the tool carrier and slide, means for operating the slide, a plurality of rotatable work spindles located between the slide and the tool carrier, means for rotating the work spindles, means for feeding stock through the work spindles and also connected with said slide, a slide supported above said work spindles, a plurality of side working tools carried by said slide, means for shifting said slide, and a plurality of stops located below said work spindles and shiftable with said slide.

42. In a multiple spindle machine, the combination of a plurality of rotatable work spindles, a slide supported above said work spindles, said work spindles extending from the front and beyond the rear of said slide, means for shifting said slide transversely relatively to the work spindles, and one or more side working tools adjustably supported by said slide.

43. In a multiple spindle machine, the combination of a plurality of rotatable work spindles, a slide supported above said work spindles, said work spindles extending from the front and beyond the rear of said slide, and means for shifting said slide transversely relatively to the work spindles, one or more side working tools adjustably supported by said slide and one or more work stops also adjustably supported by said slide.

44. In a multiple spindle machine, the combination of a sliding tool carrier, a plurality of endwise working tools carried thereby and located side by side in a horizontal plane, means for operating said sliding tool carrier, a plurality of rotatable work spindles also located in a horizontal plane side by side, means for rotating the work spindles, means for feeding stock through the work spindles from the rear thereof, a slide supported above said work spindles, means for shifting said slide transversely only relatively to the work spindles, and a plurality of tools carried by said slide, said sliding tool carrier and its tools being located in front of the work spindles and said slide, and said work spindles extending from the front of the slide to the rear thereof.

45. In a multiple spindle machine, the combination of a sliding tool carrier, a plurality of endwise working tools carried thereby and located side by side in a horizontal plane, a plurality of rotatable work spindles also located in a horizontal plane side by side, means for rotating the work spindles, means for feeding stock through the work spindles from the rear thereof, means for pulling the endwise working tools into the work carried by the work spindles, a slide supported above said work spindles, means for shifting said slide transversely only relatively to the work spindles, and a plurality of tools carried by said slide, said sliding tool carrier and its tools being located in front of the work spindles and said slide, and said work spindles extending from the front of the slide to the rear thereof.

46. In a multiple spindle machine, the combination of a sliding tool carrier, a plurality of endwise working tools carried thereby and located side by side in a horizontal plane, a plurality of rotatable work spindles also located in a horizontal plane side by side, means for rotating the work spindles, means for feeding stock through the work spindles from the rear thereof, means for pulling the endwise working tools into the work carried by the work spindles, a slide supported above said work spindles, means for shifting said slide transversely only relatively to the work spindles, a plurality of tools carried by said slide, said sliding tool carrier and its tools being located in front of the work spindles and said slide, and said work spindles extending from the front of the slide to the rear thereof, and a plurality of work stops also carried by said transversely movable slide and movable therewith.

47. In a multiple spindle machine, the combination of a sliding tool carrier, a plurality of endwise working tools carried thereby and located side by side in a horizontal plane, a plurality of rotatable work spindles located in alinement with the tools and also side by side in a horizontal plane, means for rotating the work spindles and tools one relatively to the other, pull rods connected with the tool carrier, and means for operating said pull rods thereby to pull the tools into engagement with the work.

48. In a multiple spindle machine, the combination of a plurality of rotatable work spindles, means for rotating them, a slide supported above said work spindles, said work spindles extending from the front and beyond the rear of said slide, a plurality of tools carried by said slide, a plurality of stops adjustably carried by said slide between each pair of tools, and means for shifting said slide transversely only relatively to the work spindles.

49. In a multiple spindle machine, the combination of a plurality of rotatable work spindles, means for rotating them, a plurality of slides supported above said work spindles, edge to edge, means for shifting said slides toward and from the work, and a plurality of tools supported by and shiftable with each of said slides.

50. In a multiple spindle machine, the combination of a plurality of rotatable work spindles, means for rotating them, a plurality of slides supported above said work spindles edge to edge, means for shifting said slides toward and from the work, a plurality of tools supported by and shiftable with each of said slides, and a plurality of work stops also supported by and shiftable with each of said slides.

51. In a multiple spindle machine, the combination of a plurality of rotatable work spindles, means for rotating them, a plurality of slides supported above said work spindles edge to edge, means for shifting said slides toward and from the work, a plurality of tools supported by and shiftable with each of said slides, and a plurality of work stops connected between a pair of tools with each slide for movement therewith.

52. In a multiple spindle machine, the combination of a plurality of rotatable work spindles, means for rotating them, a plurality of slides supported above said work spindles edge to edge, means for shifting said slides toward and from the work, a plurality of tools supported by and shiftable with each of said slides, a plurality of work stops connected between a pair of tools with each slide for movement therewith, and means for adjusting each of the tools relatively to its slide.

53. In a multiple spindle machine, the combination of a plurality of rotatable work spindles, means for rotating them, a plurality of slides supported above said work spindles edge to edge, means for shifting said slides toward and from the work, a plurality of tools supported by and shiftable with each of said slides, a plurality of work stops connected between a pair of tools with each slide for movement therewith, and means for adjusting each set of work stops relatively to its slide.

54. In a multiple spindle machine, the combination of a plurality of rotatable work spindles, means for rotating them, a plurality of slides supported above said work spindles edge to edge, means for shifting said slides toward and from the work, a plurality of tools supported by and shiftable with each of said slides, a plurality of work stops connected between a pair of tools with each slide for movement therewith, means for adjusting each of the tools relatively to its slide, and means for adjusting each set of work stops relatively to its slide.

55. In a multiple spindle machine, the combination of a plurality of work spindles located side by side in a horizontal plane, feeding mechanism therefor comprising a slide, means for shifting it, a rod carried by said slide, said slide having a back and forth movement relatively to the rod, and means carried by the rod for engagement with said slide whereby the rod is shifted in opposite directions thereby to feed the stock to the spindles.

56. In a multiple spindle machine, the combination of a plurality of work spindles located side by side in a horizontal plane, feeding mechanism therefor comprising a slide, means for shifting it, a plurality of rods carried by said slide, said slide having a back and forth movement relatively to the rods, and means carried by the rods for engagement with said slide whereby the rods are shifted in opposite directions thereby to feed the stock to the spindles, each of said rods operating to feed a pair of spindles simultaneously.

57. In a multiple spindle machine, the combination of a plurality of work spindles, located side by said in a horizontal plane, means for rotating said spindles and comprising a gear carried by each of the spindles and meshing one with another, a gear for driving said gears a shaft extending in parallelism with said spindles, a main driving shaft extending transversely to said spindles, meshing gears on said shafts, and means for driving said main driving shaft thereby to rotate the spindles.

58. In a multiple spindle machine, the combination of a plurality of work spindles located side by side in a horizontal plane, means for rotating said spindles and comprising a gear carried by each of the spindles and meshing one with another, a gear for driving said gears, a shaft extending in parallelism with said spindles, a main driving shaft extending transversely to said spindles, meshing gears on said shafts, and means for driving said main driving shaft thereby to rotate the spindles and including change gear mechanism.

59. In a multiple spindle machine, the combination of a plurality of work spindles, means for rotating said spindles and comprising a gear carried by each of the spindles, a gear for driving said gears, a shaft extending in parallelism with said spindles, a main driving shaft extending transversely to said spindles, meshing gears on said shafts, means for driving said main driving shaft thereby to rotate the spindles, a worm shaft, means for driving said worm shaft and comprising an upright shaft and a set of gears at each end thereof, one operative from the driving means for the main driving shaft, a cam shaft driven by said worm shaft, a sliding tool carriage, and means carried by the cam shaft for shifting said sliding tool carriage.

60. In a multiple spindle machine, the combination of a plurality of work spindles, means for rotating said spindles and comprising a gear carried by each of the spindles, a gear for driving said gears, a shaft extending in parallelism with said spindles, a main driving shaft extending transversely to said spindles, meshing gears on said shafts, means for driving said main driving shaft thereby to rotate the spindles, a worm shaft, means for driving said worm shaft and comprising an upright shaft and a set of gears at each end thereof, one operative from the driving means for the main driving shaft, a cam shaft driven by said worm shaft, a sliding tool carriage, means carried by the cam shaft for shifting said sliding tool carriage, a plurality of side working tools, and means carried by the cam shaft for shifting said side working tools.

61. In a multiple spindle machine, the combination of a plurality of work spindles, means for rotating said spindles and comprising a gear carried by each of the spindles, a gear for driving said gears, a shaft extending in parallelism with said spindles, a main driving shaft extending transversely to said spindles, meshing gears on said shafts, means for driving said main driving shaft thereby to rotate the spindles, a worm shaft, means for driving said worm shaft and comprising an upright shaft and a set of gears at each end thereof, one operative from the driving means for the main driving shaft, a cam shaft driven by said worm shaft, a sliding tool carriage, means carried by the cam shaft for shifting said sliding tool carriage, a plurality of side working tools, and means carried by the cam shaft for shifting said side working tools, said side working tools being supported above the work spindles.

62. In a multiple spindle machine, the combination of a plurality of work spindles, means for rotating said spindles and comprising a gear carried by each of the spindles, a gear for driving said gears, a shaft extending in parallelism with said spindles, a main driving shaft extending transversely to said spindles, meshing gears on said shafts, means for driving said main driving shaft thereby to rotate the spindles, a worm shaft, means for driving said worm shaft and comprising an upright shaft and a set of gears at each end thereof, one operative from the driving means for the main driving shaft, a cam shaft driven by said worm shaft, a sliding tool carriage, means carried by the cam shaft for shifting said sliding tool carriage, a plurality of side working tools, means carried by the cam shaft for shifting said side working tools, and safety mechanism between the worm shaft and the cam shaft.

63. In a multiple spindle machine, combination of a plurality of work spindles, means for rotating said spindles and comprising a gear carried by each of the spindles, a gear for driving said gears, a shaft extending in parallelism with said spindles, a main driving shaft extending transversely to said spindles, meshing gears on said shafts, means for driving said main driving shaft thereby to rotate the spindles, a worm shaft, means for driving said worm shaft and comprising a set of change gears, an upright shaft and a set of gears at each end thereof, one operative from the driving means for the main driving shaft, a cam shaft driven by said worm shaft, a sliding tool carrier, and means carried by the cam shaft for shifting said sliding tool carrier.

64. In a multiple spindle machine, the combination of a plurality of rotatable work spindles, a sliding tool carrier, means for rotating said work spindles, means for sliding said tool carrier, a slide supported above said work spindles, a side forming tool carried thereby, means for operating said slide, and a spring connected with said slide.

65. In a multiple spindle machine, the combination of a plurality of rotatable work spindles, a sliding tool carrier, means for rotating said spindles, means for sliding said carrier, a slide supported above said work spindles, a plurality of side tools carried by said slide and corresponding in number with the number of work spindles, means for shifting said slide, and a spring connected with said slide.

66. In a multiple spindle machine, the combination of four rotary spindles, gears carried by each of said spindles, means for rotating said gears and including a shaft extending in parallelism with said spindles, a main driving shaft extending transversely to said spindles, gears carried by said shafts, means including change gear mechanism for driving said main driving shaft, a worm shaft, means including change gear mechanism for rotating said worm shaft, an upright shaft, a set of bevel gears at each end thereof, one set operatively connected with the driving means for the main driving shaft, and clutch mechanism between the other set of bevel gears and the worm shaft, a cam shaft, means thereon including safety mechanism for rotating said cam shaft from the worm shaft, a sliding tool carriage, a slide, pull rods connecting the slide with the sliding tool carriage, and means carried by the cam shaft for shifting said slide.

67. In a multiple spindle machine, the combination of four rotary spindles, gears carried by each of said spindles, means for rotating said gears and including a shaft extending in parallelism with said spindles, a main driving shaft extending transversely to said spindles, gears carried by said shafts, means including change gear mechanism for driving said main driving shaft, a worm shaft, means including change gear mechanism for rotating said worm shaft, an upright shaft, a set of bevel gears at each end thereof, one operatively connected with the driving means for the main driving shaft, and clutch mechanism between the other set of bevel gears and the worm shaft, a cam shaft, means thereon including safety mechanism for rotating said cam shaft from the worm shaft, a sliding tool carriage, a slide, pull rods connecting the slide with the sliding tool carriage, and means carried by the cam shaft for shifting said slide, the work spindles being located between the sliding tool carriage and the slide.

68. In a multiple spindle machine the combination of four rotary spindles, gears carried by each of said spindles, means for rotating said gears and including a shaft extending in parallelism with said spindles, a main driving shaft extending transversely to said spindles, gears carried by said shafts, means including change gear mechanism for driving said main driving shaft, a worm shaft, means including change gear mechanism for rotating said worm shaft, an upright shaft, a set of bevel gears at each end thereof, one operatively connected with the driving means for the main driving shaft, and clutch mechanism between the other set of bevel gears and the worm shaft, a cam shaft, means thereon including safety mechanism for rotating said cam shaft from the worm shaft, a sliding tool carriage, a slide, pull rods connecting the slide with the sliding tool carriage, means carried by the cam shaft for shifting said slide, the work spindles being located between the sliding tool carriage and the slide, and means for feeding the stock to the work spindles and also connected with said slide.

69. In a multiple spindle machine, the combination of four rotary spindles, gears carried by each of said spindles, means for rotating said gears and including a shaft extending in parallelism with said spindles, a main driving shaft extending transversely to said spindles, gears carried by said shafts, means including change gear mechanism for driving said main driving shaft, a worm shaft, means including change gear mechanism for rotating said worm shaft, an upright shaft, a set of bevel gears at each end thereof, one operatively connected with the driving means for the main driving shaft, and clutch mechanism between the other set of bevel gears and the worm shaft, a cam shaft, means thereon including safety mechanism for rotating said cam shaft from the worm shaft, a sliding tool carriage, a slide, pull rods connecting the slide with the sliding tool carriage, means carried by the cam shaft for shifting said slide, the work spindles being located between the sliding tool carriage and the slide, means for feeding the stock to the work spindles and also connected with said slide, a slide supported above the work spindles, a plurality of side working tools carried by said slide, and means carried by the cam shaft for shifting the side working tool slide.

70. In a multiple spindle machine, the combination of four rotary spindles, gears carried by each of said spindles, means for rotating said gears and including a shaft extending in parallelsim with said spindles, a main driving shaft extending transversely to said spindles, gears carried by said shafts, means including change gear mechanism for driving said main driving shaft, a worm shaft, means including change gear mechanism for rotating said worm shaft, an upright shaft, a set of bevel gears at each end thereof, one operatively connected with the driving means for the main driving shaft, and clutch mechanism between the other set of bevel gears and the worm shaft, a cam shaft, means thereon including safety mechanism for rotating said cam shaft from the worm shaft, a sliding tool carriage, a slide, pull rods connecting the slide with the sliding tool carriage, means carried by the cam shaft for shifting said slide, the work spindles being located between the sliding tool carriage and the slide, means for feeding the stock to the work spindles and also connected with said slide, a slide supported above the work spindles, plurality of side working tools carried by said slide, means carried by the cam shaft for shifting the side working tool slide, and a plurality of work stops carried by and shiftable with said side tool slide.

71. In a multiple spindle machine, the combination of two pairs of rotary spindles, means for rotating them, wedge operated means carried by each of said spindles, a cam shaft, means for operating it, a pair of levers operated by said cam shaft, and duplicate means carried by each of said levers for operating a pair of said wedge operated means.

72. In a multiple spindle machine, the combination of two pairs of rotary spindles, means for rotating them, wedge operated means carried by each of said spindles, a cam shaft, means for operating it, a pair of levers operated by said cam shaft, duplicate means carried by each of said levers for operating a pair of said wedge operated means, a feed tube carried by each of said spindles, and duplicate means for operating said feed tubes, each of said means operating a pair of said tubes.

73. In a multiple spindle machine, the combination of a plurality of work spindles, a plurality of endwise working tools located in alinement with said work spindles, means for rotating the work spindles and the tools one relatively to the other, means for shifting the work spindles and the tools into engagement one relatively to the other, a plurality of cut-off and forming tools located above the work spindles, and means for shifting the same transversely only relatively to and into and out of engagement with the work.

74. In a multiple spindle machine, the combination of a plurality of work spindles, a plurality of endwise working tools located in alinement with said work spindles, means for rotating the work spindles and the tools one relatively to the other, means for shifting the work spindles and the tools into engagement one relatively to the other a plurality of cut-off and forming tools located above the work spindles, means for shifting the same transversely only relatively to and into and out of engagement with the work, and a plurality of work stops movable with said cut-off and forming tools.

75. In a metal working machine, the combination of a work spindle, a sliding tool carriage supported in front of said work spindle and adapted to carry a tool to engage the work carried by said spindle, means located at the opposite end of said spindle, actuating means for said means, and means connecting said first means with said sliding tool carriage for shifting the tool carriage toward and from the spindle and located in substantially the same horizontal plane as the work spindle and tool carriage.

76. In a metal working machine, the combination of a work spindle, a sliding tool carriage supported in front of said work spindle and adapted to carry a tool to engage the work carried by said spindle, and means located at the opposite end of said spindle and connected with said sliding tool carriage for shifting the same toward and from the spindle, said means comprising cam mechanism, a slide, and duplicate pull rods connecting said slide with the sliding tool carriage.

77. In a multiple spindle machine, the combination of a plurality of rotatable work spindles, means for rotating the spindles, a sliding tool carriage supported in front of said spindles and adapted to carry a plurality of endwise working tools corresponding in number with said work spindles, and means located at the opposite ends of said work spindles and connected with said tool carriage at each side thereof in a horizontal plane for shifting the same.

78. In a multiple spindle machine, the combination of a plurality of rotatable work spindles, means for rotating the spindles, a sliding tool carriage supported in front of said spindles and adapted to carry a plurality of endwise working tools corresponding in number with said work spindles, and means located at the opposite ends of said work spindles and connected with said tool carriage for shifting the same, said means including cam mechanism, a slide, and duplicate pull rods connecting the slide with the tool carriage and connected at each side of said tool carriage.

79. In a multiple spindle machine, the combination of a plurality of rotatable work spindles, means for rotating the spindles, a sliding tool carriage supported in front of said spindles and adapted to carry a plurality of endwise working tools corresponding in number with said work spindles, means located at the opposite ends of said work spindles and connected with said tool carriage for shifting the same, said means including cam mechanism, a slide, and pull rods connecting the slide with the tool carriage, a slide supported above said work spindles, side working tools carried thereby, and means for shifting said side working tools.

80. In a multiple spindle machine, the combination of a plurality of rotatable work spindles, means for rotating the spindles, a sliding tool carriage supported in front of said spindles and adapted to carry a plurality of endwise working tools corresponding in number with said work spindles, means located at the opposite ends of said work spindles and connected with said tool carriage for shifting the same, said means including cam mechanism, a slide, and pull rods connecting the slide with the tool carriage, a slide supported above said work spindles, side working tools carried thereby, means for shifting said side working tools, and stops connected with and movable with said last slide.

81. In a multiple spindle machine, the combination of a plurality of rotatable work spindles, means for rotating the spindles, a sliding tool carriage supported in front of said spindles and adapted to carry a plurality of endwise working tools, a slide located at the opposite ends of said spindles and connected with said sliding tool carriage, means for operating said slide thereby to shift the tool carriage, and means for feeding the stock through the work spindles and also connected with said slide for operation simultaneously with the tool carriage.

82. In a multiple spindle machine, the combination of a plurality of rotatable work spindles, means for rotating the spindles, a sliding tool carriage supported in front of said spindles and connected with said sliding tool carriage and adapted to carry endwise working tools, a slide located at the opposite ends of said spindles and connected with said sliding tool carriage, means for operating said slide thereby to shift the tool carriage, means for feeding the stock through the work spindles and also connected with said slide for operation simultaneously with the tool carriage, side forming tools slidingly supported above said work spindles, and means for shifting said tools.

83. In a multiple spindle machine, the combination of a plurality of rotatable work spindles, means for rotating the spindles, a sliding tool carriage supported in front of said spindles and adapted to carry a plurality of endwise working tools, a slide located at the opposite ends of said spindles and connected with said sliding tool carriage, means for operating said slide thereby to shift the tool carriage, means for feeding the stock through the work spindles and also connected with said slide for operation simultaneously with the tool carriage, side forming tools slidingly supported above said work spindles, means for shifting said tools, and stops also slidingly supported for movement with said side working tools.

84. In a multiple spindle machine, the combination of a plurality of rotatable work spindles, means for rotating said spindles, a sliding tool carriage supported in front of the forward ends of the work spindles and adapted to carry tools corresponding in number with the work spindles, a slide supported at the rear ends of said spindles, pull rods connecting said last slide with the sliding tool carriage, means for operating said slide, and means for feeding the stock through the work spindles and also connected with said slide for operation thereby.

85. In a multiple spindle machine, the combination of a plurality of rotatable work spindles, means for rotating said spindles, a sliding tool carriage supported in front of the forward ends of the work spindles and adapted to carry tools corresponding in number with the work spindles, a slide supported at the rear ends of said spindles, pull rods connecting said last slide with the sliding tool carriage, means for operating said slide, means for feeding the stock through the work spindles and also connected with said slide for operation thereby, a plurality of side forming tools corresponding in number with the work spindles and supported above the work spindles, and means for shifting the same.

86. In a multiple spindle machine, the combination of a plurality of rotatable work spindles, means for rotating said spindles, a sliding tool carriage supported in front of the forward ends of the work spindles and adapted to carry tools corresponding in number with the work spindles, a slide supported at the rear ends of said spindles, pull rods connecting said last slide with the sliding tool carriage, means for operating said slide, means for feeding the stock through the work spindles and also connected with said slide for operation thereby, a plurality of side forming tools corresponding in number with the work spindles and supported above said work spindles, means for shifting the same, a plurality of work stops corresponding in number with the work spindles, and means for shifting the same.

87. In a multiple spindle machine, the combination of a plurality of rotatable work spindles, means for rotating said spindles, a sliding tool carriage supported in front of the forward ends of the work spindles and adapted to carry tools corresponding in number with the work spindles, a slide supported at the rear ends of said spindles, pull rods connecting said last slide with the sliding tool carriage, means for operating said slide, means for feeding the stock through the work spindles and also connected with said slide for operation thereby, a plurality of side forming tools corresponding in number with the work spindles and supported above said work spindles, means for shifting the same, a plurality of work stops corresponding in number with the work spindles, and means for shifting the same, said last means having connection with the supporting means for the side forming tools.

88. In a multiple spindle machine, the combination of a plurality of work spindles, a plurality of endwise working tools, means for rotating the spindles and tools one relatively to the other, means for shifting the spindles and tools one relatively to the other, a plurality of slidingly supported side working tools supported above said work spindles and corresponding in number therewith, and means for shifting said tools into and out of engagement with the work.

89. In a multiple spindle machine, the combination of a plurality of work spindles, a plurality of endwise working tools, means for rotating the spindles and tools one relatively to the other, means for shifting the spindles and tools one relatively to the other, a plurality of slidingly supported side working tools supported above said work spindles and corresponding in number therewith, and means for shifting said tools into and out of engagement with the work, each of said side working tools comprising a forming and a cut-off tool.

90. In a multiple spindle machine, the combination of two pairs of rotatable work spindles, means for rotating said spindles, means for feeding stock through each of said work spindles, and a pair of means for operating said feeding means each thereof operating a pair of feeding means simultaneously.

91. In a multiple spindle machine, the combination of two pairs of rotatable work spindles, means for rotating said spindles, means for feeding stock through each of said work spindles, and a pair of means for operating said feeding means each thereof operating a pair of feeding means simultaneously and including a slide and cam mechanism for operating said slide.

92. In a metal working machine, the combination of work supporting means, a tool carrier, a cam shaft, means thereon for shifting the tool carrier, means for rotating said shaft and including a gear, and a positively operating safety device connecting said gear with said cam shaft.

93. In a metal working machine, the combination of work supporting means, a tool carrier, a cam shaft, means thereon for shifting the tool carrier, means for rotating said shaft and including a gear, and a positively operating safety device connecting said gear with said cam shaft and including a shearable pin or pins.

94. In a metal working machine, the combination of work supporting means, a tool carrier, a cam shaft, means thereon for shifting the tool carrier, means for rotating said shaft and including a gear, a member secured to said shaft, means for clamping said gear in engagement with said member, and a shearable pin or pins connecting said clamping means with said member.

95. In a metal working machine, the combination of work supporting means, a sliding tool carrier, a cam shaft, means thereon for sliding the carrier, means for rotating said shaft and including a member fixed to said shaft, a gear ring, a pair of clamping members, one secured to said gear ring and the other to the member fixed to said shaft, and a safety pin or pins connecting the clamping member secured to the gear ring with the member fixed to said shaft.

Signed at Cleveland, Cuyahoga county, Ohio, this 21st day of November, 1917.

OSCAR A. SMITH.